H. ROSENTHAL.

LEAF TOBACCO CUTTING MACHINE.

APPLICATION FILED MAY 22, 1917.

Reissued Feb. 25, 1919.

14,601.

4 SHEETS—SHEET 1.

Herman Rosenthal Inventor

By Martin Joachimson

His Attorney

H. ROSENTHAL.

LEAF TOBACCO CUTTING MACHINE.

APPLICATION FILED MAY 22, 1917.

Reissued Feb. 25, 1919.

14,601.

4 SHEETS—SHEET 2.

Herman Rosenthal Inventor

By Martin Joachimson his Attorney

THE NORRIS PETERS CO., PHOTO-LITHO., WASHINGTON, D. C.

H. ROSENTHAL.

LEAF TOBACCO CUTTING MACHINE.

APPLICATION FILED MAY 22, 1917.

Reissued Feb. 25, 1919.

14,601.

4 SHEETS—SHEET 3.

Herman Rosenthal Inventor

By Martin Joachimson

His Attorney

THE NORRIS PETERS CO., PHOTO-LITHO., WASHINGTON, D. C.

H. ROSENTHAL.

LEAF TOBACCO CUTTING MACHINE.

APPLICATION FILED MAY 22, 1917.

Reissued Feb. 25, 1919.

14,601.

4 SHEETS—SHEET 4.

Inventor:

Herman Rosenthal

By Martin Joachimson

His Attorney

THE NORRIS PETERS CO., PHOTO-LITHO., WASHINGTON, D. C.

UNITED STATES PATENT OFFICE.

HERMAN ROSENTHAL, OF YONKERS, NEW YORK, ASSIGNOR TO ROSENTHAL TOBACCO MACHINE COMPANY.

LEAF-TOBACCO-CUTTING MACHINE.

14,601. Specification of Reissued Letters Patent. Reissued Feb. 25, 1919.

Original No. 1,147,342, dated July 20, 1915, Serial No. 642,456, filed August 5, 1911. Application for reissue filed May 22, 1917. Serial No. 170,290.

*To all whom it may concern:*

Be it known that I, HERMAN ROSENTHAL, a citizen of the United States of America, residing at Yonkers, Westchester county, in the State of New York, have invented certain new and useful Improvements in Leaf-Tobacco-Cutting Machines, of which the following is a full, clear, and exact description.

This invention relates to improvements in machines for cutting and conditioning leaf tobacco to prepare the same for use in the manufacture of cigars, cigarettes, etc.

Details of construction, operation and use will hereinafter appear.

I will now proceed to describe my invention in detail, the novel features of which I will point out in the claims, reference being had to the accompanying drawings, forming part hereof, wherein:—

Figure 1:
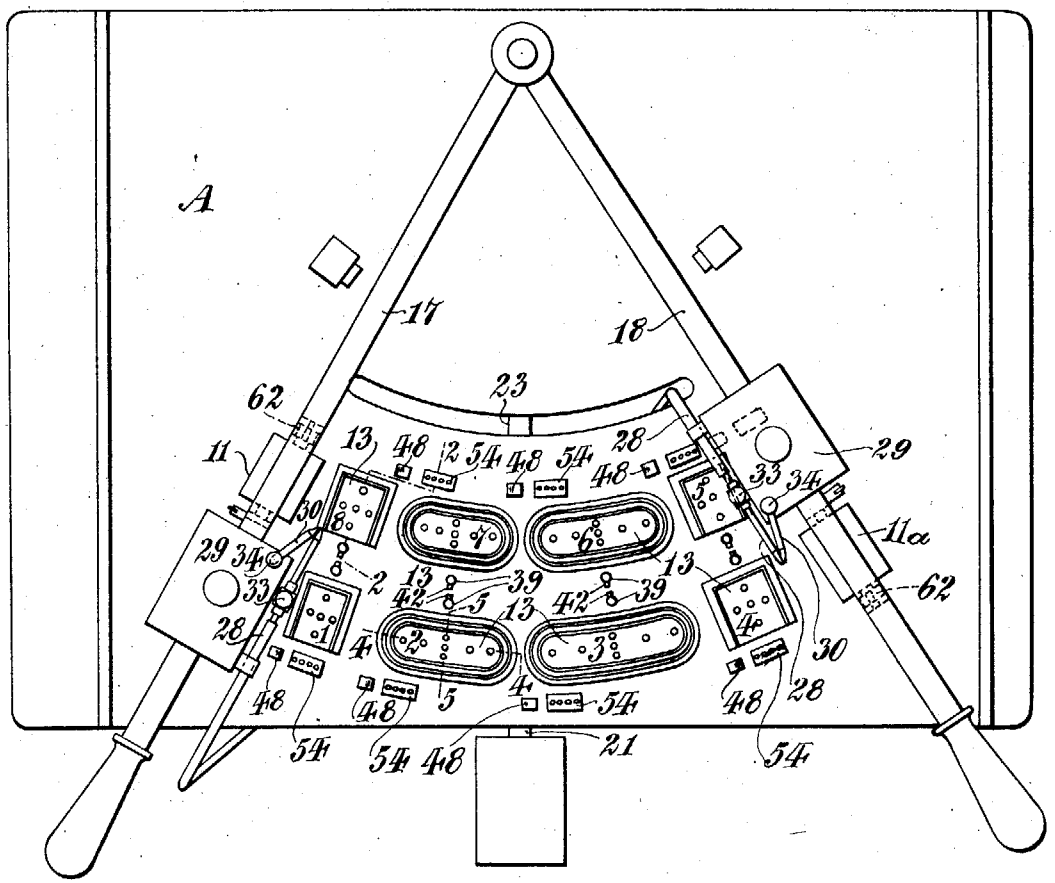
Figure 2:
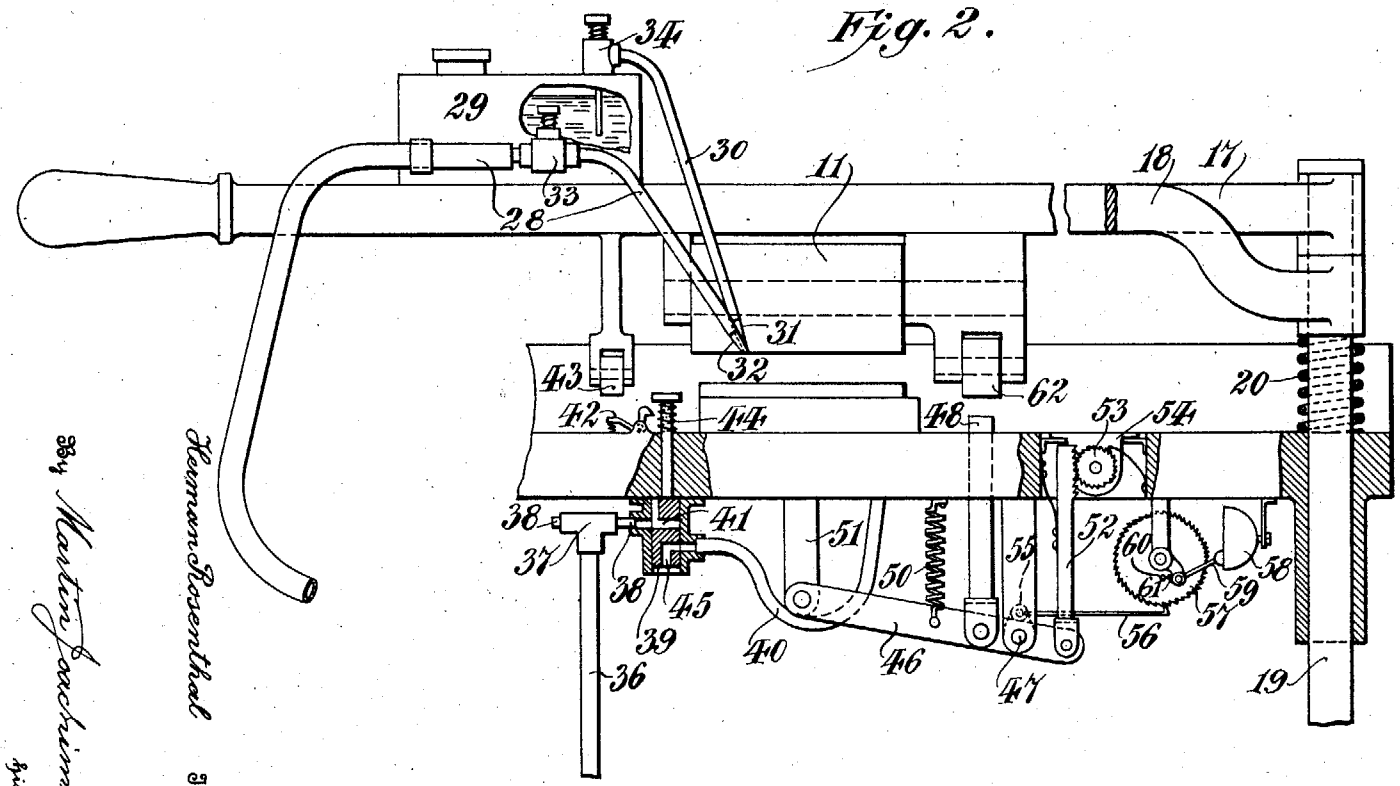
Figure 3:
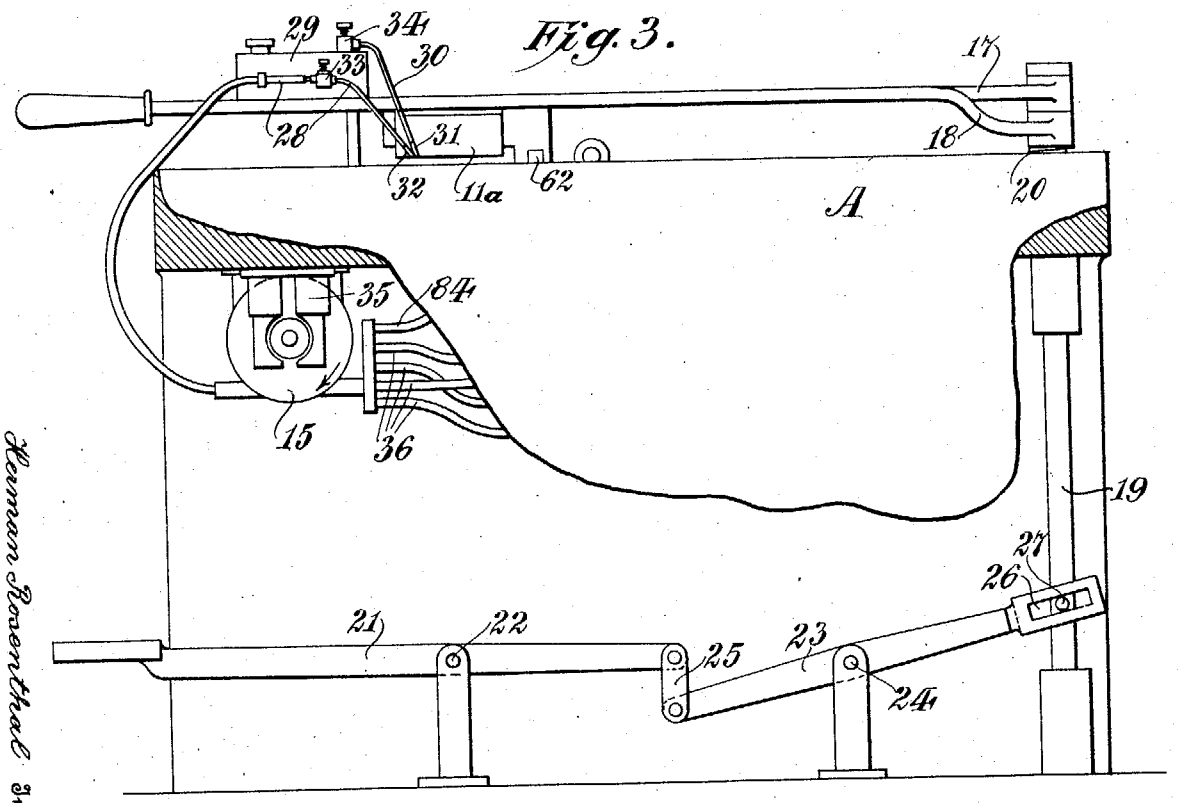
Figure 4:
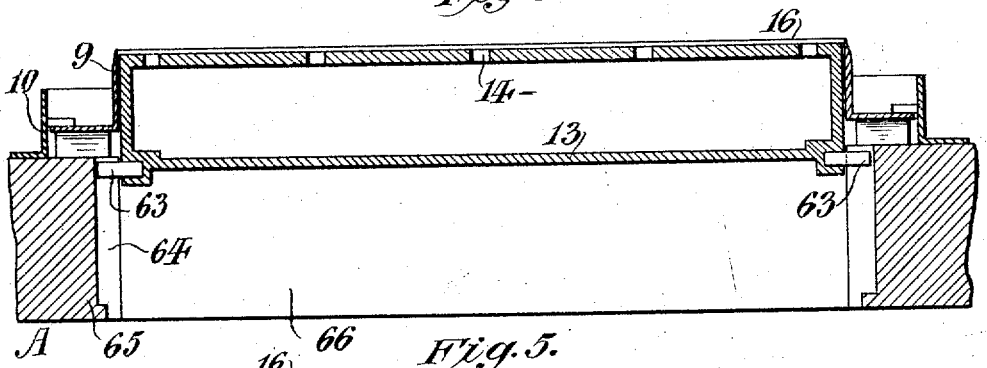
Figure 5:
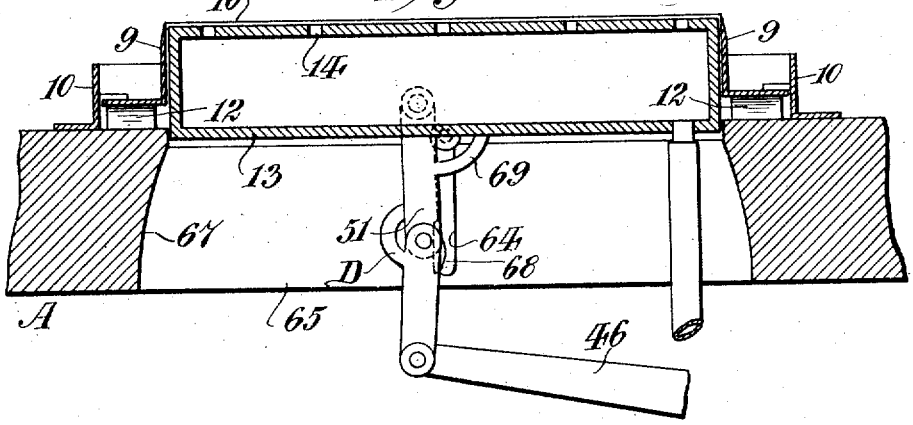
Figure 6:
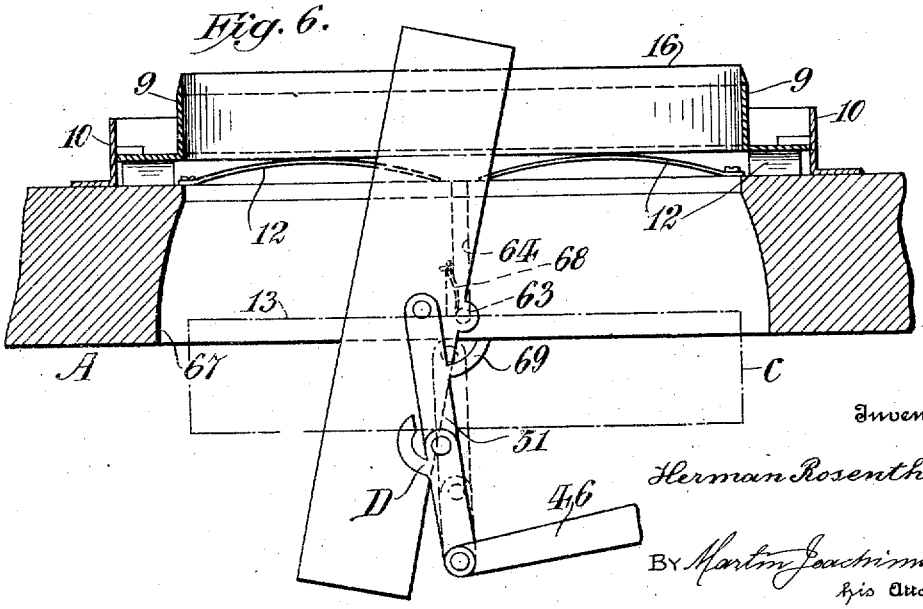

Figure 1 is a diagrammatic plan view of my improved device; Fig. 2 is an enlarged side elevation of one of the roller arms, a portion of the table being also shown, the said table being broken away to show some of the mechanism which forms part of my invention; Fig. 3 is an end view of my improved device, broken away to show the mechanism for depressing the roller arms; Fig. 4 is an enlarged sectional detail view of one of the dies and suction box therefor, the section being taken on a line 4—4 in Fig. 1; Fig. 5 is a similar view, taken on a line 5—5 in Fig. 1; Fig. 6 is a diagrammatic view, similar to Fig. 5, illustrating the suction box lowered and reversed.

As herein embodied, my invention comprises a table A upon which are mounted a plurality of cutting dies 1, 2, 3, 4, 5, 6, 7 and 8. The end dies 1, 4, 5 and 8 are designed for the cutting of binders. The dies 2, 3, 6 and 7 are designed to cut the wrappers for cigars, and are of different sizes. It will, of course, be understood that the cutting outline of the various dies referred to may be of suitable configuration for the purposes intended. By referring to Figs. 4 to 6 inclusive, it will be seen that the dies, all of which are operated alike, consist of the knives or cutting elements 9, which are loosely mounted within boxes or retainers 10, the said retainers being secured to the table 1. In order that the cutting elements 9 will yield, when the coöperating elements 11, 11ª (Fig. 1), in this instance rollers, come in contact therewith, I provide resilient buffers or springs 12 (Figs. 4 to 6) which are placed within the boxes 10 and rest upon the table, the said springs being preferably secured, at one end thereof, to the said table, as can be seen in Fig. 6, the other end of said springs or buffers being free to move. The cutting elements 9 are preferably not secured to the buffers, but merely rest thereupon by means of suitable flanges or projections extending outwardly from their vertical faces to provide bearing surfaces and supports for the dies upon the buffers or springs. The outer edges of these flanges fit loosely into frames 10 and thereby secure the dies against horizontal displacement. By this arrangement, the dies are free to move downwardly, thereby compressing the buffers, when the rollers 11 11ª strike them. The cutting elements 9, due to the presence of the springs 12, are permitted to have a tilting movement when the rollers 11 or 11ª contact therewith, that is to say, at the initial contact between the rollers and the cutting elements, the latter will first be depressed, causing the rollers to ride up on the cutting edges of the elements 9 until a point central of the length of the cutting elements is reached, after which the rollers will depress the opposite end portion of the cutting elements, causing the rollers to ride down on the cutting edges, until the rollers are free of contact with the cutting edges, whereupon the springs will return the cutting elements to normal horizontal position. By this arrangement the cutting element is enabled to perform the described tilting movement in both longitudinal and transverse directions simultaneously, whereby it is capable to assume positions in which diagonally opposite corners of its cutting edges, ordinarily in the same horizontal plane, are depressed and elevated respectively, and the portions of the die which are simultaneously beneath the roller will thus simultaneously coöperate with the same to perform the cutting operation. The other element of the dies comprises a suction box or pad 13, which is loosely fitted within the cutting elements, and is free to be moved downwardly at the proper time, and to be turned during this downward movement through an angle of 180°, obtaining thereby a reversed position. The boxes or pads 13 are perforated as at 14 in order that the leaf of tobacco can be held upon the boxes, by the pressure of the atmosphere, during the cutting operation, a partial vacuum being produced within the said boxes by a suitable exhaust fan 15, (Fig. 3), or other suitable mechanism. By the turning of the box into a reversed position, the perforations (14), which, in its initial position are directed toward the cutting plane, will then point downwardly, and a leaf of tobacco held by means of suction on this box assumes a position in a plane parallel to the cutting plane but below the same, on the same vertical axis.

It may be here stated that the edge 16 of the cutting elements is preferably flush with the top surface of the pads 13, the said edges being herein illustrated as extending slightly above the upper surfaces of the said boxes for the purposes of a clear understanding of this element of my invention.

To coöperate with the dies for the purpose of cutting the tobacco, I employ the rollers 11, 11ª before referred to, which are rotatably mounted upon arms 17, and 18, respectively, which in turn are pivotally mounted, at one end thereof, upon a vertically movable rod 19 (Fig. 2), a spring 20 being inserted between the hub of the arm 18 and the table A. To move the rod 19, I provide, in this instance, a treadle 21 pivoted as at 22, and a beam or lever 23, pivoted as at 24, the said beam and treadle being connected by a link 25. The free end of the lever or beam 23 is provided with a slot 26, in which a pin 27, carried by the rod 19, is adapted to fit. When the outer end of the treadle is depressed, the rod 19 will move downwardly, thereby compressing the spring 20 and also bringing the arms 17 and 18, and rollers 11, 11ª carried thereby, to an operative position, which will hereinafter be described.

One of the greatest problems which confronts the cigar maker is to have the tobacco in the proper condition for working, that is to say, not too dry or too damp. If the leaf is too dry there is danger of breaking it, while handling; if it is too damp, it has to be dried, as otherwise it will adhere to the suction box when the vacuum in the latter is broken. One of the chief features of my improvement is a device that will moisten a leaf that is too dry, or dry a leaf that is too damp, either of said processes being carried out while the leaf is being held upon the dies by atmospheric pressure, and particularly during the operation of cutting. This part of the improvement is of special importance as by the action of the suction upon the leaf of tobacco when in position on the die for cutting, moisture is withdrawn from the leaf and the latter is apt to shrivel during the cutting operation or soon thereafter, while the leaf is being reversed and delivered below the cutting plane. The moistening device will replenish this moisture to the same degree to which it is withdrawn, so that the cut wrapper or binder is kept to the size and in the shape to which it was cut by the cutting elements. This arrangement permits that the amount of moisture may be varied or stopped at any time without interference with the cutting operation.

The device above referred to comprises a dry air supply or duct 28 (Fig. 2) and a water suply or tank 29, having connected thereto a duct 30, having a nozzle 31, the duct 28 being also provided with a nozzle 32. The nozzles 31 and 32 are placed close together to form a spraying device. To control the flow of dry air, I provide a suitable valve 33 in the duct 28, and to control the flow of water or flavoring liquid, I provide a valve 34 for the duct 30. It will be apparent by an inspection of Figs. 1 and 2 that the ducts 28 and 30 are positioned to point in the direction of the dies, that is to say, the ducts 28 and 30 on the arm 17 point toward the dies 5 to 8, and the ducts 28 and 30 on the arm 18 point toward the dies 1 to 4. Dry air is forced through the ducts 28 from the blowing side of the fan 15, the fan being rotated in this instance by an electric motor 35, in the direction of the arrow in Fig. 3. The suction side of the fan 15 is connected by pipes 36 to the suction boxes 13, which are preferably armored rubber tubes that will give when the said boxes are tilted as shown in Fig. 6.

By an inspection of Fig. 1, it will be apparent that the dies are in pairs, that is to say, the suction boxes of the dies, 1, 8, 2, 7, 3, 6, 4, 5 and each controlled by a common pipe 36, which in turn is connected at one end thereof to a T-fitting 37 (Fig. 2), which in turn is connected by pipes 38 to an automatic valve 39, each valve 39 (one only being shown in Fig. 2) being connected to its box 13 by a flexible pipe 40. To produce a vacuum in a box 13, a valve 39 is depressed by hand, thereby bringing the port 41 in alinement with the pipes 38 and 40. The valve 39 is held down, when depressed, by a latch 42. The latch 42 is released by a roller 43, one on each arm 17 and 18 at the proper time, thereby allowing a spring 44 to force the valve 39 up and causing the air inlet port 45 to aline with the pipe 40, at which time the vacuum in the box 13 will be broken. The breaking of the vacuum occurs when a box 13 has been tilted or turned over to its full extent, as shown in Fig. 6 by dot and dash lines C, for the reason that when the roller 62 forces the plunger 48 downwardly, which action turns the suction box over, the roller 43 will contact with the catch 42, thereby releasing the stem of the valve 39, which will be forced upwardly by the spring 44, thus causing the port 45 in the valve to aline with the pipe 40, which will break the vacuum in the vacuum device.

To operate the boxes 13, I employ a special mechanism which is actuated by the arms 17 and 18. Each box 13 is provided with its own independent operating mechanism, which comprises a beam lever 46, pivoted as at 47 (Fig. 2), the said lever being actuated downwardly by a depressible plunger 48 and actuated upwardly by a spring 50. One end of the beam 46 is connected by a link 51 (see also Figs. 4 and 6) to its box 13, the other end of the said beam being provided with a rack pawl 52, which meshes with a ratchet gear 53 on a counter or cyclometer 54. The beam 46 also carries a short arm 55 which is, in turn, provided with a pawl 56, which actuates a ratchet gear 57 every time the beam 46 is depressed. At every complete revolution of the gear 57 a bell 58 is rung by means of a clapper or tongue 59, the said clapper being lifted by a pin 60 on the gear 57, when the said gear is about completing a revolution. After the pin 60 has cleared the short arm 61 of the clapper, the said clapper will fall and strike the bell. The function of the bell 58 is to sound an alarm when a predetermined number of wrappers or binders have been cut. Should I desire to be informed every time one hundred wrappers or fillers have been cut, I would supply a gear 57 having one hundred teeth. The gear 57 will advance one tooth, for instance, at each depression of a box 13, which occurs every time a leaf is cut. The cyclometer or counter 54 registers the number of binders or wrappers that have been cut. The provision of a counter serves as a check upon the operator, thereby preventing the purloining of tobacco, as there must be as many cigars made as there have been wrappers cut; barring unavoidable mishaps. To depress the plungers 48, I provide each of the arms 17 and 18 with rollers 62, which contact with and depress the said plungers just after a leaf has been completely cut and the cutting roller is at one end of the die, still being partially located over the same.

By referring to Figs. 4, 5 and 6, it will be seen that the suction box 13 is provided at each end thereof with trunnions 63, which work in guides 64 in each end wall 65 of the openings 66 in the table A. The side walls of the said opening are curved as at 67, the radial point of the said curves being coincident with the radial point of the lower end of the slot 64, the latter point being the pivotal point when the box is being turned over through the last part of its turning motion. It will also be seen by an inspection of Fig. 5, that the point of connection of the links 51 and box 13 is slightly removed from the position of the trunnions 63, which are centrally located. It will be quite obvious that the reason for this is to cause the box 13 to turn upon its trunnions as soon as they are retarded in slots 64 and especially by spring brake 68 which bears against the trunnions 63. When the beam 46 commences to rise, the box 13 will be moved to a horizontal position at which time the stop 69 on the link 51 will contact with the bottom of the box. After the stop 69 has contacted with the box, further upward movement of the beam 46 will force the box bodily upward until it reaches its normal position.

I will now proceed to describe the operation of my improved tobacco leaf cutting machine. It may here be stated that I preferably arrange the dies, as illustrated in Fig. 1, for the sake of convenience, in other words, the dies when arranged as herein illustrated are more accessible, than if arranged in a continuous line, but they may be so arranged if desired.

Before cutting a leaf of tobacco the operator will select such leaf or leaves having the proper color. After having selected the leaves he will place one of them upon a suitable die, 6 for instance. After having placed the leaf upon the die he would press down a valve 39 until the latch 42 engages the head of the stem of the valve, thereby holding the said valve down, at which time port 41 will aline with the pipe 40, which places the suction box 13 in communication with the exhaust side of the fan 15. The leaf will now be held upon the die by the pressure of the atmosphere. Should the leaf be too dry he would move the arm 17 until the pipes 28 and 30 came in line with the said leaf. After having done this, the operator would depress the valves 33 and 34, whereby water and air would be sprayed upon the leaf, thereby moistening the same. Should, however, the leaf be too damp, he would press the valve 33 only, whereby dry air would be sprayed upon the leaf, thereby drying the same to the desired extent. After the leaf of tobacco has been properly prepared, the operator would depress the treadle 21 until the roller 11 comes in contact with and presses upon the leaf upon the die. After the roller has contacted with the die, the operator moves the arm to cause the roller to pass over the face of the die, thereby cutting out the leaf to conform to the shape of the die. At about the time that the roller leaves the right end of the die, in this instance the die 6, the roller 62, on the arm 17 will contact with the plunger 48. A litle farther movement of the arm will depress the plunger 48, thereby forcing the arm 46 downwardly and moving the suction box 13 downward until the trunnions 63 come in contact with spring brake and being retarded by the same the box 13 starts to turn on its trunnions. When the trunnions of box 13 have reached the bottom of the slots 64, a little further movement of the arm 46 will cause the box 13 to turn over as indicated by the dot and dash line C in Fig. 6. At about the time that the arm 46 has traveled sufficiently to reverse the box 13, the roller 43 will contact with and depress the outer end of the latch 42, thereby moving the same out of contact with the stem of the valve 39, at which time the spring 44 will force the valve upwardly, thereby causing the port 45 to register with the pipe 40, thereby admitting air to the box 13 and breaking the vacuum therein. When the vacuum in the box 13 has been broken, the leaf of tobacco will drop from the box into a suitable receptacle.

The operator will now proceed to inspect the remaining part of the tobacco leaf from which he has just cut a cigar wrapper on die 6 and he will immediately proceed to cut another wrapper from this remaining part on one of the other dies which for the size and shape of this remainder appears to be the most suitable one, for instance die 7 which is a smaller die. The operation to cut a wrapper on this die 7 is then exactly repeated as heretofore described. As the dies, spread out before the operator, are of various sizes and shapes he may continue to cut as many wrappers from each leaf as the size or shape of the leaf permits, and it is evident that thereby each leaf can be utilized to its best advantage with a minimum of waste and most economical use of tobacco.

All of the dies are operated as above described. The arm 17 operates the dies 5 to 8 inclusive, while the arm 18 operates the dies 1 to 4 inclusive. To prevent the links 51 from buckling, when the arm 46 forces the box 13 upwardly, I provide the lower link 51 with a stop D. It will be apparent that when the suction boxes of my apparatus are tilted or turned over after the wrapper or binder is cut, the same will drop therefrom in a flattened condition and fall flat, whereby wrinkling or buckling is obviated, and this is particularly the result of my improved moistening device.

The particular advantages of my improvement are to be found in the following facts: the cut wrapper or binder is delivered below the cutting plane and no part of the delivery or transporting mechanism interferes with any operation on the cutting table during the time of delivery. In machines in which the cut wrapper is lifted above the cutting plane or transported horizontally from and over the same, the operation of the cutting roller over the die, and also the placing of another leaf upon the die by the operator, are prevented, by the delivering operation. It is obvious therefore that a considerable time saving is effected by my machine. A further advance in the art is made by the manner that the cutting plane may be deflected from the horizontal in any direction and in addition thereto the cutting roller being also resiliently supported on the springs 20, the tobacco leaf which is to be cut floats between two resilient cutting means, all portions of which will coöperate, with the result that the certainty of cutting at all points is greatly increased. This fact is of particular importance in case the edge of the die is worn at some places. Attention may be called to the fact that the suction box is mounted in such a manner within the die that it can closely follow the tilting motion of the die and the surface of wrapper carrier 14 remains parallel to the cutting plane during the cutting action. In addition to these advantages a great saving of tobacco is accomplished as stated before.

Having now described my invention, what I claim and desire to secure by Letters Patent is:

1. In a tobacco cutting machine a cutting die, a leaf carrier coöperating with said die, means to move said carrier downwardly and away from said die, and means to turn said leaf carrier during its downward movement, to transfer a leaf of tobacco from the die to a place located below said die.

2. In a tobacco cutting machine a cutting die, a tiltable leaf carrier adjacent to said die, means to remove said leaf carrier from said die perpendicularly to its cutting plane, and means to tilt said leaf carrier when in removed position, to transfer a leaf of tobacco from the cutting plane of said die to a place opposite to the base of said die.

3. In a tobacco cutting machine a cutting die, a vacuum device adjacent said die including a support for a leaf of tobacco, means for forcing the leaf against said die, means for causing the leaf support to travel downwardly and away from said die after the leaf has been cut, means to tilt said leaf support at a predetermined point in its downward movement, and means to break the vacuum in said leaf support after the latter has been tilted to its full extent.

4. In a tobacco cutting machine a cutting die, a rotatable leaf carrier adapted to support a leaf of tobacco on said die, means to rotate the leaf carrier and means to move the axis of said leaf carrier while it is rotating perpendicularly to the plane of cutting.

5. In a tobacco cutting machine a cutting element, means for pressing a leaf of tobacco against said cutting element, a pivotally mounted vacuum box for holding a leaf of tobacco against said cutting element, means coöperating with the pressing means to turn said vacuum box upon its pivots while these pivots are moving away from the cutting element and means to rarefy the air in said box.

6. In a leaf cutting machine a cutting die, a hollow rotatable leaf carrier adapted to support a leaf on said die, means to rotate the leaf carrier, means for varying the distance between the fulcrum of the leaf carrier and the die during the rotation, means for creating a partial vacuum within the leaf carrier and maintaining the same while in motion, and means to break the vacuum when the leaf carrier is at a predetermined position.

7. In a leaf cutting machine a cutting die, a rotatable, reciprocating leaf carrier adjacent to said die, means to reciprocate the leaf carrier relatively to said die and independent means to rotate said leaf carrier during its reciprocating movement.

8. In a leaf cutting machine a cutting die, a leaf carrier adapted to support a leaf on said die, means to move the leaf carrier out of engagement with said die, and other means to rotate the leaf carrier within a part of the time of said movement.

9. In a leaf cutting machine a cutting element, a pressing roller adapted to move across the cutting plane of said element, a leaf carrier adapted to hold a leaf against said cutting plane and to remove said leaf from said cutting plane and means to overturn said leaf carrier while said pressing roller is located above said cutting element.

10. In a tobacco cutting machine a cutting element, a leaf holder adjacent thereto, means to press a leaf of tobacco against said element, means to remove the leaf holder from the cutting element and away from the pressing means while this element is in engagement with the pressing means, and means to deposit said leaf at a place in vertical alinement with the place of cutting.

11. In a tobacco cutting machine a cutting element, a leaf carrier adapted to hold a leaf of tobacco against said element, and means to move the leaf carrier downward and reverse the same away from said element, to discharge the cut part of the leaf from said carrier in downward direction.

12. In a tobacco cutting machine a cutting device, a vertically movable tiltable suction box within said cutting device, means for producing a vacuum in said box, means for pressing a leaf against said cutting device, means for moving said suction box away from said cutting device after the leaf has been cut, means for tilting said box after it has been moved away from said cutting element and means for breaking the vacuum in said box after said box has been tilted.

13. In a tobacco cutting machine a cutting device, a vertically movable suction box within said cutting device, means adapted to produce a vacuum in said box, a movable arm, a roller carried by said arm adapted to press a leaf against said cutting device, means adapted to move said suction box away from said cutting device after a leaf has been cut, means adapted to tilt said box after it has been moved away from said cutting element and means coöperating with said arm adapted to break the vacuum in said box after said box has been tilted.

14. In a tobacco cutting machine a cutting element adapted for vertical movement, a vacuum device including a support for a leaf of tobacco to hold the leaf in contact with said cutting element, a movable arm, a pressing device carried by said arm for forcing a leaf of tobacco against said cutting element, means operatively associated with said arm for breaking the vacuum in said leaf support after the leaf has been cut, and means to move the leaf support away from said cutting element and reverse its position to deliver the cut part of the leaf below the cutting element.

15. In a tobacco cutting machine a cutting die fixed against material movement in one direction but free to move in a direction angular to the first direction, a pressing roller adapted to move across the cutting face of said die, and means coöperating with said die for permitting an angular deflection of its cutting face about a yielding support under the pressure of said roller.

16. In a tobacco cutting machine a cutting die, a pressing roller adapted to move across the cutting face of said die and resilient means coöperating with said die, so mounted as to permit an angular and simultaneous deflection of the cutting face in directions both longitudinally and transversely of the roller and under pressure of said roller.

17. In a cutting device a cutting die, a pressing roller, adapted to move across the cutting face of said die and resilient means coöperating with said die so mounted as to permit angular deflection and depression in deflected position of the cutting face under pressure of said roller.

18. In combination with a cutting element, and means to press the tobacco into engagement with said element to effect cutting of the tobacco, means for resiliently mounting said cutting element so that the pressing means will initially depress the front end of the element until the center of the length of the cutting element is reached, and upon continued movement of said pressing means the latter will depress the opposite end of the cutting element.

19. In a sheet cutting device a cutting element, a roller for pressing sheet material against said element, a carrier providing means to remove the cut material from said element by overturning, said removing means and said element being at all times located below the cutting plane of said element.

20. In a tobacco cutting machine a cutting element, flanges on said cutting element forming supporting surfaces for said element, resilient means engaging said flanges to support the cutting element and permitting angular deflection and depression in deflected position of said element.

21. In a tobacco cutting machine a cutting element, a hollow leaf carrier adjacent to said element, means to rarefy the air within said leaf carrier, means to move said leaf carrier away from said cutting element when a leaf of tobacco is carried thereon, means to release the leaf from said carrier at a predetermined point and means to apply selectively a quantity of moisture to said leaf when held by said leaf carrier to prevent shriveling of said leaf while so held.

22. In a cutting device a substantially stationary cutting element, a roller for pressing sheet material against said element, and a carrier providing means to remove the cut material from said element by overturning, said removing means being at all times located below the cutting plane of said element.

23. In a tobacco cutting machine a cutting element, pressing means engaging said element to cut a leaf of tobacco, means to hold said leaf on said cutting element and adapted to withdraw moisture from said leaf during the cutting operation, a moistening device, including means to control the amount of moisture delivered thereby, operatively associated with the pressing means to replace, during the cutting operation the moisture which is simultaneously withdrawn by the holding means.

24. In a tobacco cutting machine a cutting couple adapted to cut a leaf of tobacco, means coöperatively connected with said cutting couple to moisten the tobacco during the cutting operation, and means controlling the supply of moisture to instantly vary the amount delivered thereby.

25. In a tobacco cutting machine a plurality of cutting devices, a movable leaf carrier adjacent to each of the cutting devices, means to remove each leaf carrier from its cutting device and means common to all cutting devices to operate selectively the removing means of any cutting device.

26. In a sheet cutting machine a pair of cutting devices, each consisting of a cutting die, a cutting roller adapted to engage said die and a removable leaf carrier adjacent to said die, means for creating a partial vacuum, means to open selectively a connection from the vacuum creating means to either one of said leaf carriers, means common to both rollers to bring either roller into engagement with its die, and operating means for severing said vacuum connection at a predetermined position of said cutting roller.

27. In a tobacco cutting machine a plurality of cutting elements, a movable leaf holder adjacent to each cutting element, means for creating a partial vacuum within each leaf holder, means to selectively connect any one leaf holder with the vacuum creating means and operating means, common to all cutting elements, for severing said vacuum connection at a predetermined position of said leaf holder.

28. In a sheet cutting machine a plurality of cutting devices, each device consisting of a cutting die and a leaf carrier adjacent to said die, means to remove the leaf carrier from its die, means to create a partial vacuum, means to connect selectively any one of the leaf carriers to the vacuum means, and means common to all cutting devices for severing said connection at a predetermined position of said removing means.

29. In a tobacco cutting machine, a plurality of cutting devices, a movable arm common to all cutting devices, means for holding a leaf of tobacco on each of said cutting devices, a water spraying device and a dry air spraying device, each carried by said arm, whereby said water and air spraying devices are capable of being directed toward any of said cutting devices.

30. In a tobacco cutting machine a cutting element, means for holding a leaf of tobacco on said cutting element, means for pressing said cutting element and the leaf thereon together, a liquid spraying means and a dry air supplying means arranged so that the discharge of each will be directed toward the leaf on said cutting element, the liquid spraying means and said dry air supplying means being both carried by said pressing means so as to move with the latter to permit the pressing and spraying operations to be performed in a single movement of the pressing means.

31. In a tobacco cutting machine a resiliently mounted cutting element, a suction device adjacent to said cutting element for holding a leaf of tobacco and being capable of movement away from said cutting element, a movable arm, means carried by said arm for moving the leaf holding device away from said cutting element after the leaf has been cut, and means for breaking the vacuum in said suction device after said suction device has been moved away from said cutting device.

32. In a tobacco cutting machine a plurality of independent cutting dies, means for holding a leaf of tobacco on each of said dies, a movable pressing device common to all of said dies arranged to press a leaf against the cutting element of said dies and a moistening device carried by said pressing device and movable therewith so as to moisten the leaf before cutting thereof in a single operation of the pressing device.

33. In a sheet cutting machine a pair of cutting devices, each device consisting of a cutting die and pressing means adapted to engage said die; operating means common to both pressing means, to bring either one of the pressing means singly into engagement with its die.

34. In a sheet cutting machine a pair of cutting devices each consisting of a cutting die, a pressing roller adapted to engage said die, a leaf carrier adjacent to said die and means to remove each leaf carrier from its die; operating means common to both rollers adapted to permit a coöperative movement of each roller with the removing means of a leaf carrier.

35. In a sheet cutting device a cutting die, a sheet carrier coöperating with said die, means to remove said sheet carrier toward the base of said die and means to rotate said carrier when in removed position about an axis parallel to the cutting face of said die.

HERMAN ROSENTHAL.

Copies of this patent may be obtained for five cents each, by addressing the "Commissioner of Patents. Washington, D. C."